United States Patent
Meier

Patent Number: 5,287,113
Date of Patent: Feb. 15, 1994

[54] VOLTAGE LIMITING BATTERYLESS TRANSPONDER CIRCUIT

[75] Inventor: Herbert Meier, Moosburg, Fed. Rep. of Germany

[73] Assignee: Texas Instruments Deutschland GmbH, Freising, Fed. Rep. of Germany

[21] Appl. No.: 12,609

[22] Filed: Feb. 2, 1993

Related U.S. Application Data

[63] Continuation of Ser. No. 849,781, Mar. 10, 1992, abandoned, which is a continuation of Ser. No. 654,478, Feb. 13, 1991, abandoned.

[51] Int. Cl.⁵ ................................. G01S 13/80
[52] U.S. Cl. ........................... 342/51; 342/44
[58] Field of Search ..................... 342/51, 44, 42

[56] References Cited

U.S. PATENT DOCUMENTS

| | | | |
|---|---|---|---|
| 3,806,905 | 4/1974 | Strenglein | 342/44 |
| 3,855,592 | 12/1974 | Davis et al. | 342/44 |
| 3,914,762 | 10/1975 | Klensch | 342/44 |
| 3,964,024 | 6/1976 | Hutton et al. | 342/44 X |
| 4,019,181 | 4/1977 | Olsson et al. | 342/44 |
| 4,040,053 | 8/1977 | Olsson | 342/42 |
| 4,068,232 | 1/1978 | Meyers et al. | 342/44 |
| 4,345,253 | 8/1982 | Hoover | 342/44 |
| 4,364,043 | 12/1982 | Cole et al. | 340/825.54 |
| 4,471,344 | 9/1984 | Williams | 340/572 |
| 4,663,625 | 5/1987 | Yewen | 342/51 X |
| 4,724,427 | 2/1988 | Carroll | 342/44 X |
| 4,870,419 | 9/1989 | Baldwin et al. | 342/50 |
| 4,912,471 | 3/1990 | Tyburski et al. | 342/42 |
| 4,937,581 | 6/1990 | Baldwin et al. | 342/44 |
| 5,025,492 | 6/1991 | Viereck | 342/44 |
| 5,053,774 | 10/1991 | Schuermann et al. | 342/44 |

FOREIGN PATENT DOCUMENTS

| | | |
|---|---|---|
| 0301127 | 2/1989 | European Pat. Off. . |
| 1577920 | 10/1980 | United Kingdom . |
| 2208058 | 2/1989 | United Kingdom . |

*Primary Examiner*—John B. Sotomayor
*Attorney, Agent, or Firm*—Rebecca A. Mapstone; James C. Kesterson; Richard L. Donaldson

[57] ABSTRACT

A battery-less transponder (12) for transmitting stored measurement data to an interrogation device (10) is described. The interrogation device (10) transmits an HF interrogation pulse for calling up the stored measurement data. The transponder (12) includes a resonant circuit (14) tuned to the frequency of the HF interrogation pulse, an energy storage element (C3) which is chargeable by rectification of the HF interrogation pulse and in the charged state furnishes the supply voltage for the transponder (12), and a voltage limiting means (Z, R) for limiting the voltage at the energy storage element (C3) to a predetermined voltage value. For detuning the resonance frequency thereof, a component (C4) of frequency-dependent impedance can be connected to the resonant circuit (14) via a switching element (T) which establishes the connection in dependence upon the starting of the limiting action by the voltage limiting means (Z, R).

6 Claims, 1 Drawing Sheet

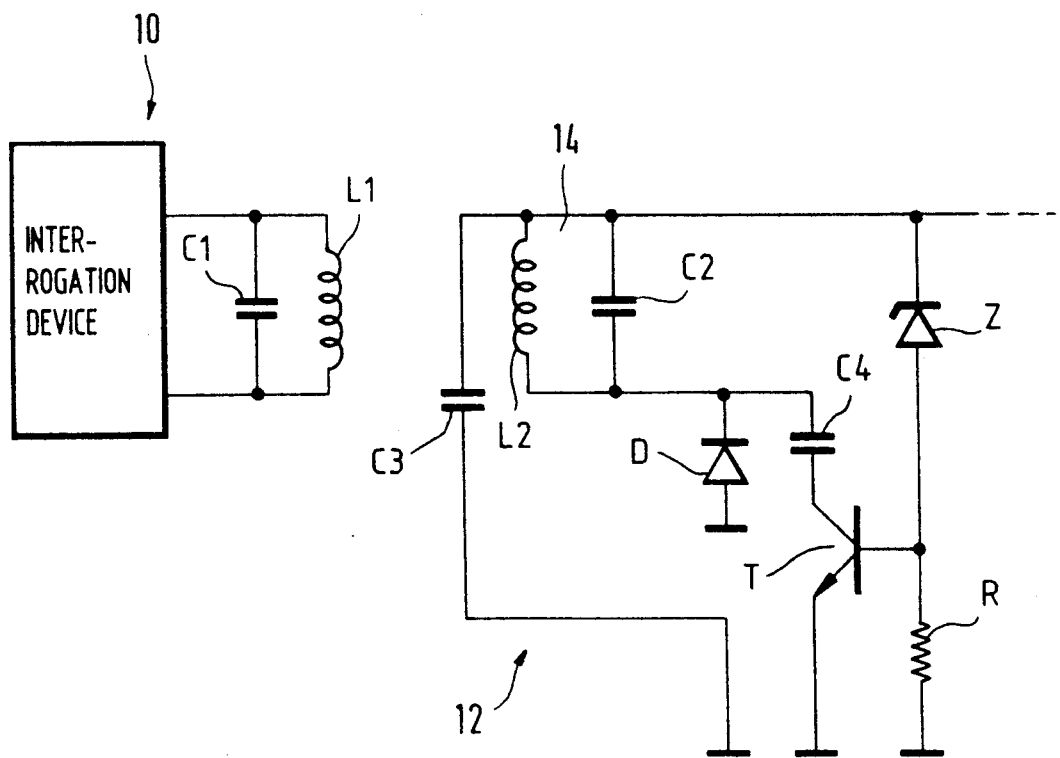

VOLTAGE LIMITING BATTERYLESS TRANSPONDER CIRCUIT

This application is a continuation of application Ser. No. 07/849,781, filed Mar. 10, 1992 which is a continuation of application Ser. No. 07/654,478 filed Feb. 13, 1991, both now abandoned.

The invention relates to a battery-less transponder for transmitting stored measurement data to an interrogation device which for calling up the stored measurement data transmits an HF interrogation pulse, comprising a resonant circuit tuned to the frequency of the HF interrogation pulse, an energy storage element which is chargeable by rectification of the HF interrogation pulse and in the charged state furnishes the supply voltage for the transponder and a voltage limiting means for limiting the voltage at the energy storage element to a predetermined voltage value.

EP-A-0 301 127 discloses a battery-less transponder which inter alia has the ability of detecting measurement data with the aid of a sensor, storing said data and keeping them ready for transmission to an interrogation device. Reading of the measurement data with the aid of the interrogation device is carried out in that said interrogation device is brought into the vicinity of the transponder, whereupon an HF interrogation pulse is transmitted from the interrogation device to the transponder. Since the transponder does not have its own current supply the supply voltage required for the detection, storing and transfer of the measurement data is generated by rectification of the HF interrogation pulse received by the transponder, the rectified HF interrogation pulse serving to charge an energy storage element in the form of a capacitor from which the required supply voltage can then be tapped. Due to the storage effect of the energy storage element this supply voltage is also available after termination of the HF interrogation pulse for a period of time sufficient to detect the desired measured value, store said value and also transmit it to the interrogation device. For receiving the HF interrogation pulse the transponder contains a resonant circuit which is tuned into the frequency of the HF interrogation pulse. This is necessary to ensure optimum energy transfer from the interrogation device to the transponder.

If it is desired for a relatively large distance to be possibly present between the interrogation device and the transponder during the interrogation operation the HF interrogation pulse must be a high-energy pulse. This has however the disadvantage that when the interrogation device is brought too close to the transponder whilst the HF interrogation pulse is being transmitted the voltage at the capacitor serving as energy store can rise to inadmissibly high values. In the known transponder this is prevented by a voltage limiting means in the form of a zener diode which limits the voltage at the capacitor to a predetermined value. On excessive energy supply to the transponder it is necessary to eliminate the excess energy. In this operation the excess energy is converted to heat which leads to an increase in the temperature of the transponder components. This is disadvantageous when for example the temperature at the location of the transponder is to be measured with the sensor disposed in the transponder and transmitted to the interrogation device. In this specific case it is essential to avoid the sensor being heated due to power loss in the transponder itself and not due to the ambient temperature at the location of the transponder to be measured.

The invention is based on the problem of further developing a transponder of the type set forth at the beginning so that the power loss converted therein is greatly reduced even under excessive energy supply from the outside.

This problem is solved according to the invention in that to the resonant circuit for detuning the resonance frequency thereof a component with frequency-dependent impedance can be connected via a switching element which establishes the connection in dependence upon the start of the limiting action by the voltage limiting means.

When using the configuration of the transponder according to the invention the resonant circuit stimulated to oscillate at its resonance frequency by the HF interrogation pulse is detuned with the aid of a component with frequency-dependent impedance so that it no longer oscillates and thus no longer effects any further charging of the energy storage element as soon as the predetermined voltage value at said energy storage element is reached and the action of the voltage limiting means thereby starts. This reliably prevents too much excess energy being converted in the transponder to heat which could lead to falsification of the data to be acquired.

Advantageous further developments of the invention are characterized in the subsidiary claims.

BRIEF DESCRIPTION OF THE DRAWING

An example of embodiment of the invention will now be explained by way of example with the aid of the drawing. The single FIGURE of the drawing shows a schematic circuit diagram of the interrogation device and of the part of the transponder necessary for the explanation of the invention.

DETAILED DESCRIPTION

In the drawing an interrogation device 10 is illustrated with the aid of which data stored in a transponder 12 can be called up. Of the interrogation device 10 only an oscillating circuit having a capacitor C1 and a coil L1 is shown in detail, the coil L1 serving as antenna coil for which when performing an interrogation cycle an HF interrogation pulse can be transmitted. Said coil L1 also serves as receiving coil for the measurement data sent back by the transponder 12.

The transponder 12 includes a resonant circuit 14 having a capacitor C2 and a coil L2, the resonance frequency of which is equal to the frequency of the HF interrogation pulse transmitted by the interrogation device 10. An HF interrogation pulse transmitted by the interrogation device 10 stimulates the resonant circuit 14 to oscillate, the oscillation being rectified with the aid of a diode D. With the rectified voltage the capacitor C3 is charged and acts as energy storage element for the transponder 12. The voltage at the capacitor C3 acts after termination of the HF interrogation pulse as supply voltage for the transponder, the size of the capacitor C3 being so dimensioned that the energy stored therein suffices to send the measurement data back from the transponder 12 to the interrogation device 10. The data sent back may contain an address identifying the transponder 12 and a measurement data value which has been detected with the aid of a sensor, not illustrated in the drawing, at the location of the transponder. The energy stored in the capacitor C3 suffices also to detect the measurement data.

In the transponder 12, parallel to the capacitor C3 there is a series circuit comprising a zener diode Z and a resistor R. The charge voltage at the capacitor C3 can thereby be limited to the voltage value defined by the zener voltage of the zener diode Z. As soon as the charge voltage at the capacitor C3 exceeds the value of the zener voltage the zener diode Z becomes conductive so that current flows through the resistor R to ground.

The transponder 12 further includes a capacitor C4 which by means of a transistor T can be connected to the resonant circuit 14 in such a manner that due to its frequency-dependent impedance it results in detuning of the resonant circuit. The capacitor C4 with its frequency-detuning effect becomes effective when the charge voltage at the capacitor C3 exceeds the zener voltage of the zener diode Z so that current starts to flow through the resistor R. The voltage drop then occurring at the resistor R puts the transistor T into the conductive state and as a result the capacitor C4 becomes effective as frequency-governing component at the resonant circuit 14.

Assuming that the interrogation device 10 transmits an HF interrogation pulse of relatively high energy to the transponder 12, the capacitor C3 will be rapidly charged by the rectified oscillations of the resonant circuit 14 and if no special precautions are taken would reach a charge voltage which can be harmful to the rest of the transponder circuit.

For limiting the charge voltage at the capacitor C3 the excess energy in the transponder must be converted to heat. However, this results in undesirable effects on the sensor disposed in the transponder with which for example the temperature of the transponder surroundings is to be measured. To avoid the power loss occurring and manifesting itself in undesirable heating from becoming too large the transistor T by going into its conductive state when the predetermined charge voltage at the capacitor C3 is exceeded ensures that the capacitor C4 can shift the resonance frequency of the resonant circuit 14 so that the resonant circuit 14 can no longer be stimulated to oscillate by the HF interrogation pulse from the interrogation device 10. As a result the charging of the capacitor C2 is interrupted and the undesired dissipation of excess energy avoided. The heating generated in the transponder by the power loss is thus reduced as far as possible.

Alternatively to the addition of the capacitor C4 with the objective of obtaining detuning of the resonance frequency of the resonant circuit 14, the transistor T could also be inserted into the circuit in such a manner that when the predetermined charge voltage at the capacitor C3 is exceeded it separates the capacitor C2 of the resonant circuit 14 from the circuit, thereby interrupting the oscillations. When this alternative is employed the same effect would be achieved as with the circuit illustrated in the drawing.

Examples of implementation of the interrogation device 10 and the transponder 2 are provided in U.S. application Ser. No. 216,756, filed Jul. 8, 1988, assigned to the assignee of the present application and incorporated by reference herein.

I claim:

1. Circuitry for use with a batteryless transponder for limiting the energy absorbed from a received interrogation signal having a selected frequency comprising:
   a resonant circuit comprising at least a first coil and a first capacitor, tuned to said selected frequency;
   a rectifier for rectifying said interrogation signal;
   an energy storage element operable to be charged by said rectified interrogation signal;
   voltage limiting circuitry for limiting the voltage available from said energy storage element to a predetermined level;
   a frequency dependent element distinct from the components making up said resonant circuit;
   a switching device, for connecting or disconnecting said frequency dependent element with respect to said resonant circuit in response to a current flow through said voltage limiting circuitry for substantially detuning said resonant circuit so as to inhibit absorption of energy from said interrogation signal.

2. The voltage limiting circuit of claim 1, wherein said frequency dependent element comprises a capacitor.

3. The voltage limiting circuit of claim 1, wherein said switching device is a switching transistor having a current path connected in series with said frequency dependent element, said transistor being switched into a conductive state by a current flowing through said voltage limiting circuitry.

4. The voltage limiting circuit of claim 1, wherein said voltage limiting circuitry comprises a series circuit including a zener diode and a resistor, said voltage limiting circuitry connected in parallel to said energy storage element.

5. The voltage limiting circuit of claim 1, wherein said switching transistor has an input connected between said zener diode and said resistor.

6. A method for limiting the energy absorbed by a batterlyess transponder circuit from a received interrogation signal having a selected frequency comprising the steps of:
   providing a resonant circuit comprising at least a first coil and a first capacitor and tuned to said selected frequency;
   rectifying said interrogation signal;
   charging an energy storage element with said rectified interrogation signal;
   limiting the voltage available from said energy storage element to a predetermined level by a voltage limiting device;
   connecting or disconnecting said frequency dependent element with respect to said resonant circuit by a switching device which operates in response to a current flowing through said voltage limiting device so as to substantially detune said resonant circuit and inhibit absorption of energy from said interrogation signal.

* * * * *